United States Patent [19]
Ross

[11] Patent Number: 5,673,305
[45] Date of Patent: Sep. 30, 1997

[54] APPARATUS AND METHOD FOR TRACKING AND REPORTING THE LOCATION OF A MOTOR VEHICLE

[75] Inventor: John S. Ross, Marietta, Ga.

[73] Assignee: Worldwide Notification Systems, Inc., Atlanta, Ga.

[21] Appl. No.: 260,914

[22] Filed: Jun. 15, 1994

Related U.S. Application Data

[63] Continuation of Ser. No. 229,105, Apr. 8, 1994, abandoned, Ser. No. 62,406, May 14, 1993, Pat. No. 5,351,194, and Ser. No. 62,405, May 14, 1993, abandoned, said Ser. No. 229, 105, is a continuation of Ser. No. 62,408, May 14, 1993, abandoned.

[51] Int. Cl.$^6$ ..................................................... H04Q 7/20
[52] U.S. Cl. .............................. 379/58; 379/40; 340/426; 342/357
[58] Field of Search ................................ 379/58, 59, 57, 379/63, 61, 37, 40, 44, 45; 342/457, 357; 340/988, 426; 455/33.1, 54.1

[56] References Cited

U.S. PATENT DOCUMENTS

| | | | |
|---|---|---|---|
| 3,824,469 | 7/1974 | Pistonbatt | 325/39 |
| 3,870,994 | 3/1975 | McCormick | 343/6.5 R |
| 3,886,515 | 5/1975 | Cottin et al. | 340/23 |

(List continued on next page.)

FOREIGN PATENT DOCUMENTS

| | | | |
|---|---|---|---|
| 2559930 | 8/1985 | France | 340/994 |
| 0123562 | 4/1983 | United Kingdom . | |
| 8311303 | 4/1983 | United Kingdom . | |
| 8816449 | 7/1988 | United Kingdom . | |

OTHER PUBLICATIONS

AVIONICS, *Business & Commercial Aviation*, May 1993, pp. 168–172.
Chapman Security Systems, Inc. (Bensenville, Illinois), "Chapman 911CLS", Product Catalogue, undated, 4 pages.
"Device Lets Motorists Send 'Mayday' At Touch of Button," The Atlanta Journal/The Atlanta Constitution, May 18, 1993.
International Teletrac Systems, "Have an Unfair Advantage Over Car Thieves", Advertising Flyer, 1990, 3 pages.
International Teletrac Systems, "How to Put Your Fleet on the Map", Advertising Flyer, undated, 5 pages.
Klass, Philip J., "Airline Officials Foresee Quick Growth in Use of GPS, Glonass on Commercial Transports", *Aviation Week and Space Technology*, Jun. 29, 1992, p. 54.
Klass, Philip J., "FAA Steps Up Program to Introduce GPS as Instrument Approach Aid", *Aviation Week and Space Technology*, Aug. 17, 1992, pp. 35–36.
Klass, Philip J., "GPS Demonstration Results Push System Into Forefront for Airport Traffic Plan", *Aviation Week and Space Technology*, Dec. 16, 1991, p. 42.
Logsdon, Tom, *The Navstar Global Positioning System*, Van Nostrand Reinhold, 1992.
Magnavox Advanced Products and Systems Company (Advertising Flyer), "Presenting the most advanced AVLS available," 1988, 6 pages.
Mets, Inc. (Indianapolis, Indiana), "Public Safety Police, Fire and Emergency Medical Services", 1989, 4 pages.
Mets, Inc. (Indianapolis, Indiana), "Trucking National & Regional Fleet Control", 1989, 4 pages.
Nordwall, Bruce D., "Low Price, New Ideas Fuel GPS Growth", *Aviation Week and Space Technology*, Nov. 30, 1992, p. 48.

(List continued on next page.)

*Primary Examiner*—William Cumming
*Assistant Examiner*—William G. Trost
*Attorney, Agent, or Firm*—Howrey & Simon; Thomas J. Scott, Jr.

[57] ABSTRACT

An apparatus and method of tracking and reporting the location of a mobile article, such as a stolen motor vehicle. A controller receives and analyzes positioning signals transmitted from known locations to determine the location of the motor vehicle. The controller contacts a central tracking station to report the theft and the location of the motor vehicle.

10 Claims, 3 Drawing Sheets

U.S. PATENT DOCUMENTS

| | | | |
|---|---|---|---|
| 4,009,375 | 2/1977 | White et al. | 235/150.24 |
| 4,107,675 | 8/1978 | Sellers et al. | 343/6.5 LC |
| 4,177,466 | 12/1979 | Reagan | 343/112 TC |
| 4,220,946 | 9/1980 | Henriot | 340/23 |
| 4,325,057 | 4/1982 | Bishop | 340/539 |
| 4,360,875 | 11/1982 | Behnke | 364/436 |
| 4,630,289 | 12/1986 | Wren | 375/71 |
| 4,642,775 | 2/1987 | Cline et al. | 364/443 |
| 4,673,936 | 6/1987 | Kotoh | 342/51 |
| 4,688,026 | 8/1987 | Scribner et al. | 340/572 |
| 4,791,571 | 12/1988 | Takahashi et al. | 364/436 |
| 4,799,162 | 1/1989 | Shinkawa et al. | 364/436 |
| 4,818,998 | 4/1989 | Apsell et al. | 342/44 |
| 4,821,309 | 4/1989 | Namekawa | 379/63 |
| 4,888,595 | 12/1989 | Friedman | 342/457 |
| 4,891,650 | 1/1990 | Sheffer | 342/457 |
| 4,897,642 | 1/1990 | DiLullo et al. | 379/58 |
| 4,908,627 | 3/1990 | Santos | 342/125 |
| 4,908,629 | 3/1990 | Apsell et al. | 342/457 |
| 4,910,493 | 3/1990 | Chambers et al. | 340/426 |
| 5,014,206 | 5/1991 | Scribner et al. | 364/449 |
| 5,021,780 | 6/1991 | Fabiano et al. | 340/994 |
| 5,021,794 | 6/1991 | Lawrence | 342/457 |
| 5,025,247 | 6/1991 | Banks | 340/574 |
| 5,032,845 | 7/1991 | Velasco | 342/457 |
| 5,043,736 | 8/1991 | Darnell et al. | 342/357 |
| 5,055,851 | 10/1991 | Sheffer | 342/457 |
| 5,081,667 | 1/1992 | Drori et al. | 379/59 |
| 5,099,245 | 3/1992 | Sagey | 342/357 |
| 5,103,459 | 4/1992 | Gilhousen et al. | 375/1 |
| 5,109,341 | 4/1992 | Blackburn et al. | 364/424.05 |
| 5,168,451 | 12/1992 | Bolger | 364/436 |
| 5,197,009 | 3/1993 | Hoffman, Jr. et al. | 364/443 |
| 5,208,756 | 5/1993 | Song | 455/54.1 |
| 5,216,429 | 6/1993 | Nakagawa et al. | 342/463 |
| 5,218,367 | 6/1993 | Sheffer et al. | 342/457 |
| 5,218,620 | 6/1993 | Dumond, Jr. et al. | 379/59 |
| 5,221,925 | 6/1993 | Cross | 342/457 |
| 5,223,844 | 6/1993 | Mansell et al. | 342/457 |
| 5,243,529 | 9/1993 | Kashiwazaki | 364/449 |
| 5,247,564 | 9/1993 | Zicker | 379/58 |
| 5,266,922 | 11/1993 | Smith et al. | 455/54.1 X |
| 5,276,728 | 1/1994 | Pagliaroli et al. | 379/58 |
| 5,301,368 | 4/1994 | Hirata | 379/58 |
| 5,334,974 | 8/1994 | Simms et al. | 379/59 |
| 5,379,319 | 1/1995 | Satoh et al. | 379/61 |

OTHER PUBLICATIONS

Nordwall, Bruce D., "Imagination Only Limit to Military, Commercial Applications for GPS", *Aviation Week and Space Technology*, Oct. 14, 1991, p. 60.

Nordwall, Bruce D., "Flight Tests Highlight New GPS Uses, Emphasize Need for GPS/Glonass System", *Aviation Week and Space Technology*, Dec. 2, 1991, p. 71.

Trimble Navigation (Sunnyvale, California), "Fleetvision Integrated Fleet Management System", undated, 9 pages.

Trimble Navigation (Sunnyvale, California), "Starfinder GPS Intelligent Mobile Sensor", 1991, 2 pages.

Trimble Navigation (Sunnyvale, California), "Starview Tracking and Display Station", undated, 1 page.

Westinghouse (Baltimore, Maryland), "Vehicle Management System", Product Catalogue, undated, 4 pages.

APPARATUS AND METHOD FOR TRACKING AND REPORTING THE LOCATION OF A MOTOR VEHICLE

CROSS REFERENCE TO RELATED APPLICATIONS

This application is a continuation of application to Ross et al. entitled "Apparatus and Method for Tracking and Reporting the Location of a Motor Vehicle," Ser. No. 08/229,105 filed Apr. 8, 1994, now abandoned, which is a continuation of application to Ross et al., having the same title, Ser. No. 08/062,408, filed May 14, 1993, now abandoned. This application is also a continuation of application to Ross et al. entitled "Apparatus and Method for Closing Flight Plans and Locating Aircraft," Ser. No. 08/062,406, filed May 14, 1993, U.S. Pat. No. 5,351,194 and incorporated herein by reference and also a continuation of application to Ross entitled "Apparatus and Method of Notifying A Recipient of An Unscheduled Delivery," Ser. No. 08/062,405, filed May 14, 1993, now abandoned, and incorporated herein by reference.

TECHNICAL FIELD

The present invention generally relates to location tracking apparatus. More particularly, the present invention relates to an apparatus and method for tracking and reporting the location of a motor vehicle.

BACKGROUND OF THE INVENTION

Theft of motor vehicles is an increasing problem in many areas. Motor vehicles are stolen for a number of reasons, including joy-rides of relatively short duration, use in other criminal activities, and theft for dismantling into parts for resale.

A number of devices have been developed to address the problem of motor vehicle theft. Some of these devices are mechanical devices while others are electronic alarm systems. Mechanical devices that are used to reduce motor vehicle theft include a fixed member that attaches to the steering wheel. A portion of the member extends radially from the steering wheel and can be positioned in contact with the windshield. This prevents the steering wheel from being turned so that the car cannot be driven. Another mechanical device provides a metal bar that attaches to the steering wheel and to the brake pedal. This device also prevents the steering wheel from being rotated.

Electronic alarm systems also have been used to reduce motor vehicle theft. These alarm systems have a controller mounted in the motor vehicle, which is activated by a switch or code. The alarm reacts if entry of the vehicle is attempted without de-activating the alarm. Most alarm systems include means for generating attention-getting signals to alert the owner, operator, and others, of the attempted break-in or theft of the motor vehicle. These attention-getting signals include flashing lights and sounding of a horn or alarm. Some known alarm systems will also prevent the car from being started or operated. For instance, the gas supply may be shut-off or the electrical system disabled so that the car cannot be started or operated after a short duration. Despite these features, automobiles with electronic alarm systems are among those motor vehicles that are stolen, although it is believed to be at a lower rate.

While these devices provide some deterrent effect, vehicle theft continues. For example, false alarms are triggered by other cars passing nearby or by persons inadvertently hitting the motor vehicle. Sometimes the alarms are ignored by passersby. Also, different forms of motor vehicle theft are occurring. One form is referred to as "car jacking" in which the car is stolen while being lawfully operated. This is accomplished by forced entry into the motor vehicle at a stop light, stop sign, intersection and the like. In other instances, the theft occurs as the operator returns to the motor vehicle at a parking lot. The mechanical devices described above have the drawback of requiring time to detach the device from the steering wheel prior to operating the motor vehicle. This time interval may provide opportunity for the car to be forcibly seized from the operator.

Another electronic system provides a motor vehicle with a radio transmitter. After the car is reported as stolen, police authorities activate the radio transmitter. Police cars equipped with special receivers use triangulation or homing processes to track and locate the stolen vehicle. If however the vehicle is not reported as stolen for a period of time, the vehicle may be moved out of range or disassembled into component parts for resale.

Accordingly, there is a need in the art for an improved tracking and reporting apparatus to track and locate mobile articles and stolen motor vehicles.

SUMMARY OF THE PRESENT INVENTION

The present invention provides an apparatus and method of tracking and reporting the location of mobile articles. More particularly, the present invention provides an apparatus and method that determines the location of the article and reports the location to a central tracking center.

Generally described, the present invention comprises a controller which attaches to a motor vehicle. A receiver attaches to the controller. The receiver receives positioning signals from a plurality of transmitters located at known positions. The controller analyzes the positioning signals to determine the location of the motor vehicle. For a motor vehicle, a plurality of sensors communicate with the controller. The sensors detect entry into the motor vehicle. An activation device switches the controller from an inactive state to an active state for detecting and responding to entry of the motor vehicle. An interface connects to the controller for communicating location information to a central monitoring station. The interface preferably accesses a cellular telephone system to call the central station.

The present invention provides a method for tracking and reporting the location of a stolen vehicle. A controller mounted in the motor vehicle communicates with a plurality of sensors attached to entry points in the motor vehicle. The sensors detect entry into the motor vehicle. If the controller is not properly de-activated with a special code, the controller begins tracking the motor vehicle. The controller first seizes control of the communications apparatus. Preferably the communications apparatus provides access to a cellular telephone system. The controller then analyzes the positioning signals received from transmitters at known locations. Using the positioning signals, the controller determines the location of the motor vehicle. The controller then reports the location of the motor vehicle to the central station using the communication apparatus.

In another aspect of the present invention, the controller responds to inquiries from the central station to further report the location of the motor vehicle. In this way, the central monitoring station can track the travel of the stolen motor vehicle. The central station communicates with police authorities in the proper jurisdiction to intercept the stolen motor vehicle.

Accordingly, it is an object of the present invention to reduce the amount of time required to recover a stolen motor vehicle.

It is another object of the present invention to increase the rate of recovery of stolen motor vehicles.

Another object of the present invention is to improve the method required to track and locate stolen motor vehicles.

These and other objects, advantages and features of the present invention will become apparent from a reading of the following detailed description of the invention and claims in view of the appended drawings.

DETAILED DESCRIPTION OF THE PREFERRED EMBODIMENTS

Figure 1:
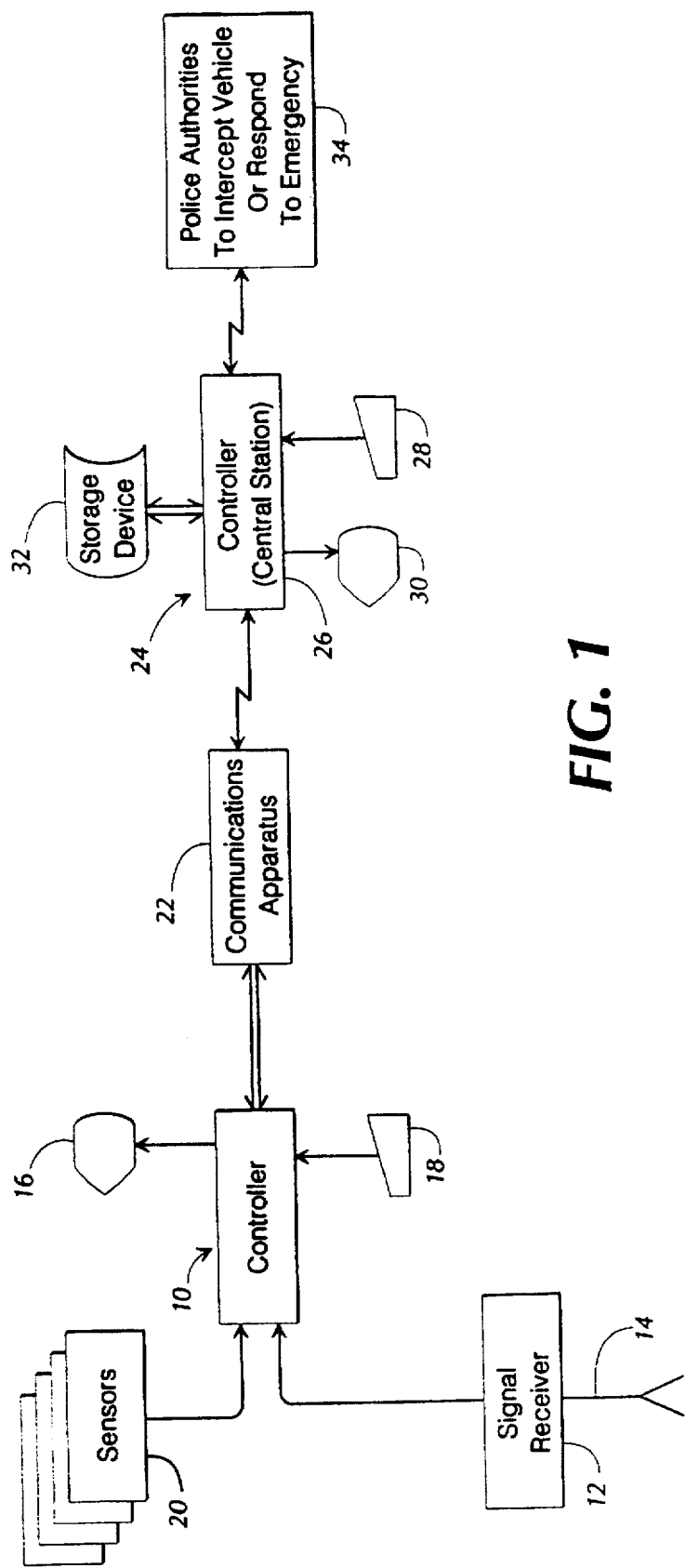
FIG. 1 is a schematic view of an apparatus for reporting the location of a stolen motor vehicle.

Referring now in more detail to the drawings, in which like numerals indicate like parts throughout the several views, FIG. 1 illustrates a schematic view of an apparatus for tracking and reporting the location of a stolen motor vehicle. The apparatus includes a controller 10 that mounts to the motor vehicle. The controller 10 preferably mounts in a location that is not readily visible from outside of the motor vehicle. For example, the controller 10 preferably mounts in the trunk compartment of the motor vehicle. A receiver 12 communicates with the controller 10. The receiver 12 includes an antenna 14 for receiving signals broadcast by a plurality of transmitters operating at separate known locations. The controller 10 includes a status display device generally designated 16. The status display 16 may be a plurality of lights, a liquid crystal display screen, or the like, for displaying the operational status of the controller 10. For example, a plurality of light emitting diodes may be placed in an array to indicate the status of the controller. A red diode is lit to indicate that the controller 10 is armed and monitoring the motor vehicle. A yellow light indicates that the controller 10 is disabled from detecting entry.

The controller 10 connects to an activation device 18. In a preferred embodiment, the activation device 18 comprises a touch pad or a plurality of selectable switches. The switches may be designated by numerals or letters. Commands to operate the controller 10 are entered by pushing sequences of the switches, as discussed below. The controller 10 also connects a plurality of sensors 20 attached to various entry points of the motor vehicle. For example, spring biased switches (not illustrated) may be fixed in the door jams to open a circuit to the controller 10 when the door of the motor vehicle is opened. Other sensors are similarly positioned against an edge of the trunk lid, the hood, and the other doors of the motor vehicle. The sensors 20 detect entry into the motor vehicle and communicate a signal to the controller 10. The controller 10 accordingly defines an electronic complex operatively associated with a mobile article, such as a motor vehicle for monitoring and reporting the location of the article.

The controller 10 connects to an interface which operatively engages a communications apparatus 22. In a preferred embodiment, the communications apparatus 22 includes a transmitter, a receiver, and a telephone dialing mechanism for accessing a cellular telephone system. For example, the interface 22 connects to a conventional cellular telephone. The controller 10 uses the cellular telephone to communicate with a central monitoring station 24 for tracking and locating the motor vehicle.

The central monitoring station 24 includes a controller 26 for receiving telephone messages from the controller 10. The controller 26 at the central station 24 is capable of receiving signals from a plurality of controllers mounted in separate motor vehicles, for purposes of tracking several stolen motor vehicles simultaneously. The controller 26 responds to instructions entered by an operator through a keyboard 28. A video display screen 30 displays information about the stolen motor vehicle and its location. This information would include the owner's name and address, telephone number and description of the motor vehicle. The display 30 shows a map grid with an indicator designating the location of the stolen motor vehicle.

The controller 26 accesses a storage device 32 which maintains information regarding the motor vehicles registered with the central station 24. The storage device also includes the mapping information for displaying the street grid and location of the stolen motor vehicle.

The central station 24 communicates through telephone or radio to police authorities 34 for tracking and intercepting the stolen motor vehicle, as discussed below. The controller 26 of the central station 24 accordingly is a central electronic complex, preferably a high-speed, main-frame computer or the like capable of communicating with a plurality of controllers 10 in separate mobile articles.

Figure 2:
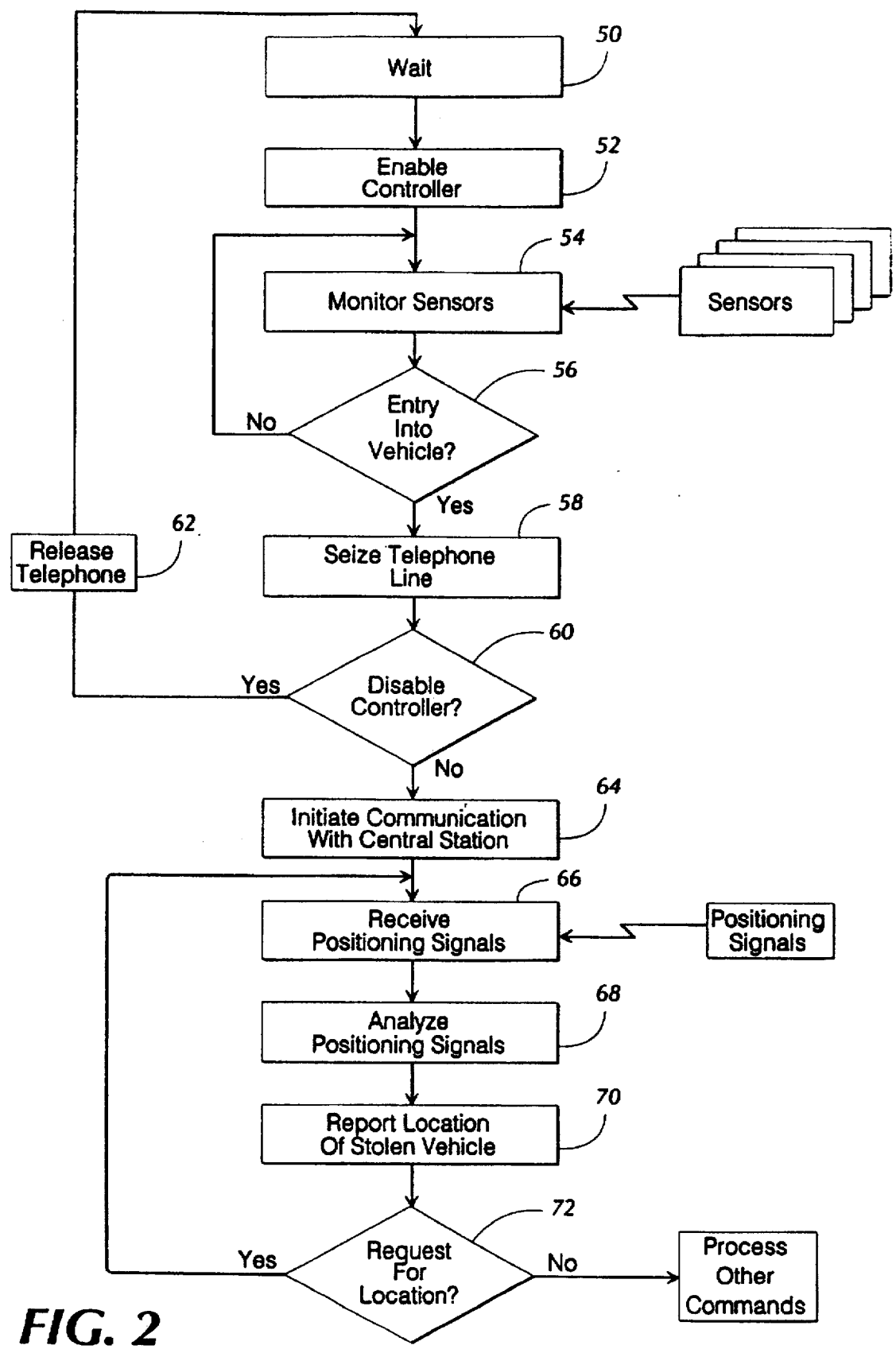
FIG. 2 is a flow chart of the method of detecting and reporting the location of a stolen motor vehicle.

The apparatus in operation requires that the owner of a motor vehicle first register with the central station 24. Registration provides the central station 24 with the name and address of the owner, as well as a description of the motor vehicle. FIG. 2 illustrates a flowchart of a preferred embodiment of the method of tracking and reporting the location of the motor vehicle in the event of an improper entry. The controller 10 initially enters a wait state 50 pending entry of commands through the keypad 18. The owner activates the detection mode by entering a command in the form of a sequence of switches. In a preferred embodiment, the keypad includes a plurality of keys. Each key has letter or number identifier. The commands are defined sequences of keys. For example, a four-key sequence is programmed to be recognized by the controller 10 as enabling 52 the detection mode. The controller 10 monitors the plurality of sensors 20, polling each in sequence 54. The sensors 20 are switches which, when opened, interrupt a signal to the controller 10. An interrupted signal from a sensor 20 indicates entry 56 into the motor vehicle.

Upon detection of entry into the motor vehicle, the controller 10 seizes control 58 of the communications apparatus 22 in the motor vehicle. In the preferred embodiment, the controller 10 acquires the control of the cellular telephone. In a preferred embodiment, the controller 10 disables power to the cellular telephone display. This decoys the would-be thief into believing the telephone is not operative. If the person entering the motor vehicle disables 60 the controller 10 from the detection mode, the controller releases 62 the communications apparatus 22 and returns to the wait state 50. If the controller 10 is not disabled within a predetermined interval, the controller initiates communication 64 with the central station 24. In a preferred embodiment, the interval is 30 seconds. The interval can be changed by entering a command for changing the interval and the new interval of delay.

The controller 10 then receives 66 a plurality of positioning signals from the receiver 12. In a preferred embodiment, the receiver 12 receives signals broadcast by satellites in low earth orbit, which are part of a global positioning system known as GPS. The controller 10 analyzes 68 the signals to determine the location of the motor vehicle. The positioning signals are analyzed to determine the longitudinal and latitudinal coordinates of the location of the motor vehicle, with accuracy of about three meters. The controller 10 then reports 70 to the central station 24 through the communications apparatus 22. The controller 10 communicates that the motor vehicle is stolen and provides the location of the motor vehicle. This information preferably is communicated in code form to the controller 26 at the central station. The information includes an identifier unique to the particular motor vehicle. The controller 26 accesses the storage device 32 to determine the owner's name, telephone number in the vehicle, and the description of the vehicle. This information is displayed on the video screen 30 together with a street grid with an identifier showing the location of the motor vehicle. The controller 10 waits 72 for the operator at the central station 24 to poll for additional information. This includes asking the controller 10 to update the location of the motor vehicle. In an alternate embodiment, the controller 10 is placed in an update mode. In this mode, the controller 10 periodically receives and evaluates the positioning signals, and communicates the location to the controller 22. The operator contacts the police authorities in the community in which the stolen motor vehicle is being operated. With conventional street grid mapping software, the operator identifies the location of the motor vehicle for interception and recovery by the police. With the controller 10 periodically reporting the location, the police authorities can track and recover the motor vehicle.

In an alternate embodiment, the operator at the central station 24 disconnects the cellular phone call and immediately places a return call to the motor vehicle. The driver is asked for a special reply code in order to cancel the reported theft as a false alarm. If the special reply code is not provided, the operator then proceeds to contact the police authorities to intercept the motor vehicle. In this embodiment, the controller 10 again seizes control of the communication apparatus 22 and re-initiates communication with the central station 24 for periodically identifying the location of the motor vehicle.

In an alternate embodiment, the operator can communicate instructions from the controller 26 to the controller 10. The controller 10 is operatively engaged to the headlights of the motor vehicle and to a sounding device. Upon instruction, the controller 10 begins flashing the headlights on and off and sounding the horn. These signals help the police authorities to locate the vehicle. The controller 10 may also be instructed to cut the electrical power to the engine or to shut off the supply of gas to the engine. By tracking the location of the motor vehicle, the operator could disable the vehicle on a side street or other safe location.

Figure 3:
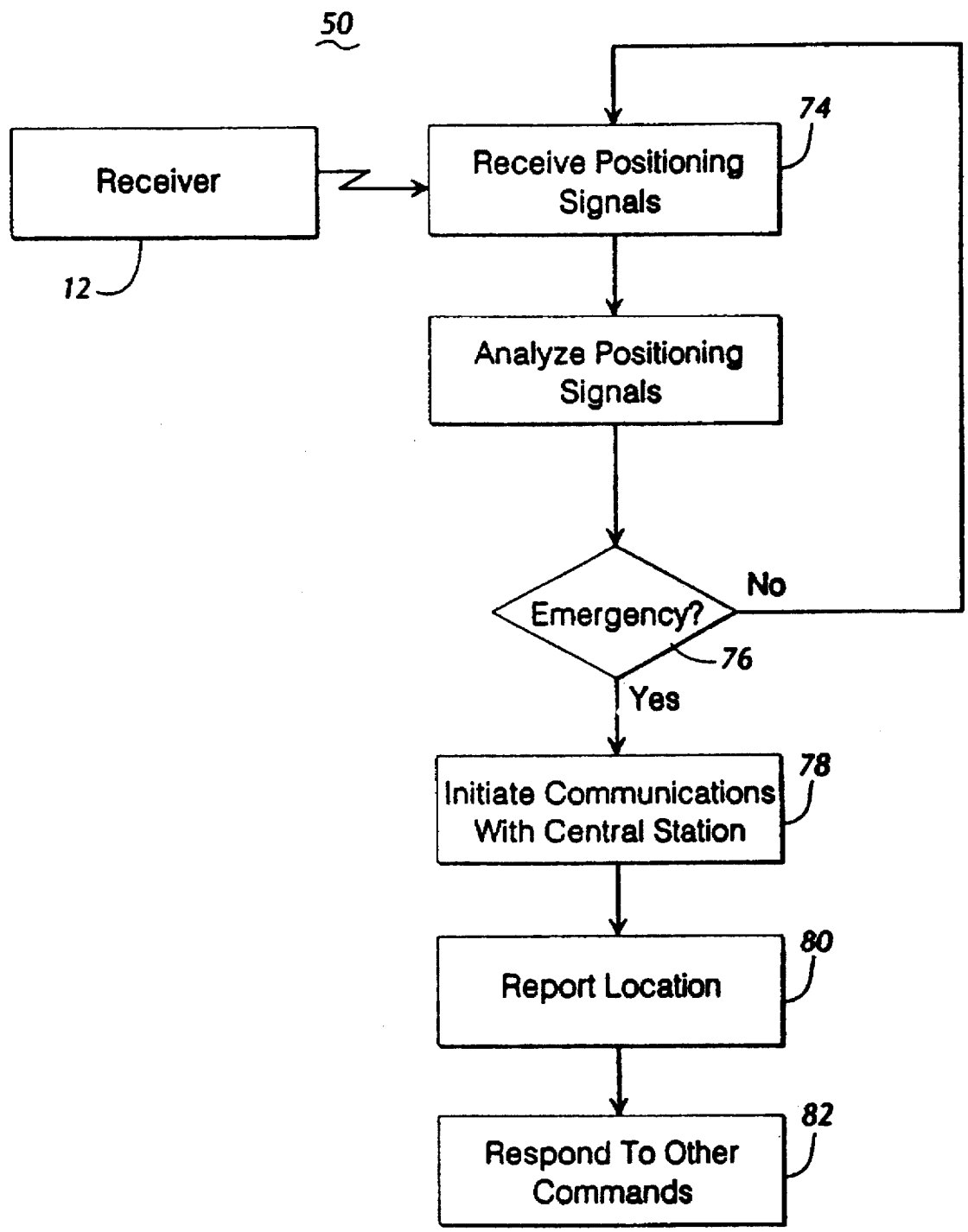
FIG. 3 is a flow chart of an alternate embodiment in which the apparatus monitors the changing location of the motor vehicle in order to report its location in an emergency.

FIG. 3 is a flow chart of an alternate embodiment for using the communications apparatus 22 when the controller 10 is in the wait state 50. In this embodiment, the controller 10 periodically receives 74 and analyzes the positioning signals. This period is selectively changed. In a preferred embodiment, the interval is once per minute. Should an emergency sensor become activated 76, the controller 10 seizes control 78 of the communications apparatus 22, as discussed above. One emergency sensor connects to the release switches for the air-bag safety system in the motor vehicle. When the air-bag is deployed, the controller 10 communicates with the central station 24 through the communications apparatus 22. The controller 10 sends 80 a coded message that the particular motor vehicle has crashed and sends the location coordinates. The controller 10 then stands-by 82 for receiving and responding to further inquiries from the central station 24, as discussed above. A number of operator actuated switches may be connected to controller 10 for communicating specific information and the vehicle's location to the central station in response to actuation of the switch. For example, an emergency switch may be actuated by the vehicle operator to inform the central station of an emergency condition and transmit the vehicle's location.

A preferred embodiment of the present invention uses a microprocessor such as that in the Travelmate 4000 Texas Instrument notebook computer for the controller 10. The microprocessor connects to a keyboard or keypad for entry of commands to the controller 10. The controller 10 also communicates with the signal receiver 12, for receiving the GPS positioning signals. The microprocessor communicates in both a transmitting and receiving mode with the communications apparatus 22 which preferably is a cellular telephone apparatus. For transmitting, the microprocessor communicates through an interface including a Texas Instruments SN65CBC176 driver to a cellular modem for accessing the cellular system. A Texas Instruments TL052 amplifier feeds the signal from the driver to a TLE2062 amplifier to match with telephone line signals. For receiving, the cellular modem communicates with a Texas Instruments SN75CBC176 receiver through a TLE2062 line matching amplifier and a TL052 amplifier. A Texas Instruments TLC1550 analog-to-digital converter converts the received signal for input to the microprocessor through an interface that includes a Texas Instruments SN75LBL176 receiver. This enables the controller 10 to access the communications apparatus 22 for communicating with the central station 24.

The present invention accordingly provides an apparatus and method of tracking and reporting the location of a mobile article such as a motor vehicle. The apparatus determines that an improper entry was made into the motor vehicle and promptly reports the entry and the location of the motor vehicle to a central station. The present invention reduces time required to recover a stolen vehicle, increases the opportunity to recover the vehicle before it can be damaged or cut into parts, and facilitates the efforts of the police authorities to recover stolen property.

The present invention, however, broadly tracks mobile articles. In this aspect of the invention, the apparatus can be used in other environments. One such environment is for tracking the location of persons. These environments include ski resort areas, fire fighting activities, disaster relief, recreational safety, and parolee or "house-arrest" monitoring. The controller 10, the receiver 12, and the communications apparatus 22 are packaged in a light-weight container and carried by a person. The package would preferably be attached to a belt or strapping for wearing by the person. A switch-like sensor 20 is used to signal the controller 10 to initiate communications with the central station 26 and report the location of the person carrying the apparatus. Two-way voice communication could be exchanged by signalling the controller 10 to permit use of a handset voice receiver and speaker, such as a telephone handset (not illustrated). The location reporting devices could be used at ski resorts to assure that all skiers were off the ski slopes before closing. However, the location reporting apparatus is particularly useful for locating stranded skiers, persons working in hazardous conditions such as disasters or fires, and lost hikers, rock climbers and the like.

In house-arrest situations, persons are sentenced by courts to remain in or near their homes. This form of detention reduces demand for jail space which often experiences overcrowding. Government costs and expenses are reduced, as such house-arrest is typically less expensive than operating and maintaining jail facilities. For this application, the controller 10 is attached by a strap to the arrestee. The strap is not removable. If removed, a sensor 20 in the strap signals the controller 10 to initiate communications with the central station and report the last location of the arrestee. The controller 10 is also programmed to monitor the geographic area in which the arrestee is permitted to move. If the arrestee moves out of the geographic area, the controller 10 again initiates communication with the central station 24 to report the location of the arrestee. In an alternate embodiment, the controller 10 is programmed to randomly determine the location of the arrestee or parolee and report the location by accessing the communications apparatus 22.

In yet another application, the package of the controller 10, the receiver 12, and the communications apparatus 22 is attached to mobile wildlife for tracking and monitoring, for example, migration patterns. Periodically, the controller 10 determines the location of the animal and reports the location to the central station. If the health of the animal needs to be checked, the animal is readily located.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described in the following claims.

What is claimed is:

1. A method of monitoring a mobile vehicle comprising the steps of:
   (a) storing at a station information describing the vehicle and a predetermined reply code allowing vehicle operator to cancel a reported unauthorized use or entry of the vehicle;
   (b) receiving at the vehicle a positioning signal from each of a plurality of satellites;
   (c) determining at the vehicle the location of the vehicle based upon the received positioning signals;
   (d) enabling a vehicle alarm system, said alarm system comprising a plurality of sensors, at least one of said sensors detecting a use of or entry into the vehicle;
   (e) detecting at the vehicle the use of or entry into the vehicle in response to said step (d);
   (f) establishing a first communications link from the vehicle to the station to report the unauthorized use of or entry into the vehicle and the location of the vehicle in response to said step (e);
   (g) receiving the report of the unauthorized use or entry of the vehicle at the station via said first communications link, and subsequently disconnecting said first communications link;
   (h) establishing a second communications link from the station to the vehicle, in response to said step (g), to request an occupant of the vehicle to input into a vehicle input device a reply code to cancel the reported unauthorized use or entry, said vehicle communicating any inputted codes to the station;
   (i) determining at the station whether the station receives a communication from the vehicle including the predetermined reply code in response to said step (h); and
   (j) communicating a control signal from the station to the vehicle if the station does not receive the predetermined reply code from the vehicle, said control signal causing the vehicle to activate one or more vehicle output devices.

2. The method of claim 1 and further comprising the step of reporting the unauthorized use or entry of the vehicle to a party or authorities if the station does not receive the predetermined reply code from the vehicle.

3. The method of claim 1 wherein said step (j) comprises the step of communicating a control signal from the station to the vehicle if the station does not receive the predetermined reply code from the vehicle, said control signal causing the vehicle to activate at least one of vehicle lights, a vehicle horn, and an audible vehicle alarm.

4. The method of claim 1, further comprising the step of the vehicle periodically determining and communicating the location of the vehicle to the station.

5. The method of claim 1, wherein said step (a) comprises the step of storing at a station information describing the vehicle, the name, address and telephone number of the vehicle's owner, and a predetermined reply code allowing a vehicle operator to cancel a reported unauthorized use or entry of the vehicle.

6. The method of claim 1 wherein said step (i) comprises determining at the station whether the station receives a communication from the vehicle including the predetermined reply code in response to said step (h) within a predetermined time period.

7. The method of claim 6 wherein said step (j) comprises the step of communicating a control signal from the station to the vehicle if the station does not receive the predetermined reply code from the vehicle within a predetermined time period, said control signal causing the vehicle to activate one or more vehicle output devices.

8. The method of claim 7, wherein said predetermined time period is variable, said method further comprising inputting information into a controller to reprogram or change the predetermined time period to a new predetermined time period.

9. The method of claim 1, wherein said step (b) comprises receiving at the vehicle a positioning signal from each of a plurality of global positioning system (GPS) satellites, and said step (c) comprises determining at the vehicle the location of the vehicle based upon the received GPS positioning signals.

10. The method of claim 1, further comprising the step of, in response to said step (f), the station periodically communicating a signal to the vehicle to request the vehicle's location.

* * * * *